Feb. 2, 1954     W. D. DRUMMOND     2,668,062
VEHICLE TRAILER WITH DEMOUNTABLE HYDRAULIC LIFT
Filed Aug. 31, 1951     2 Sheets-Sheet 2
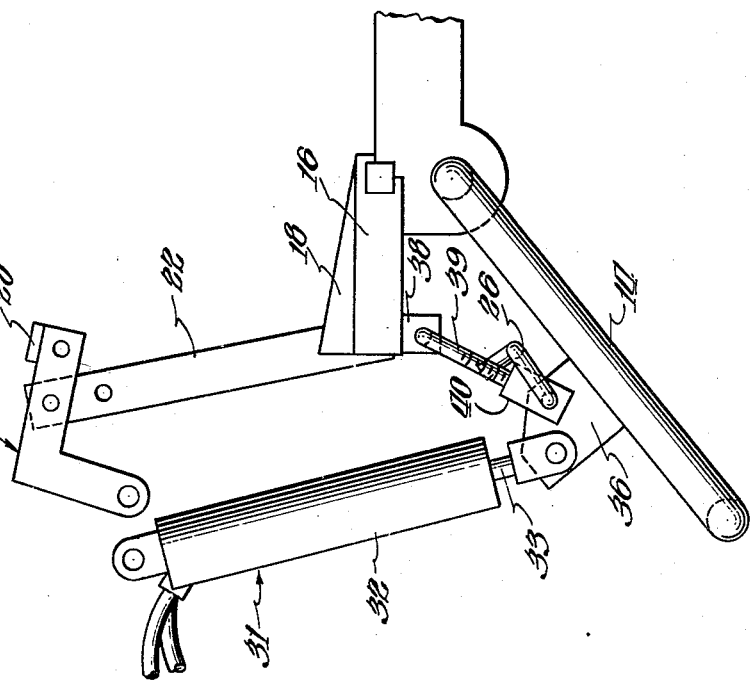
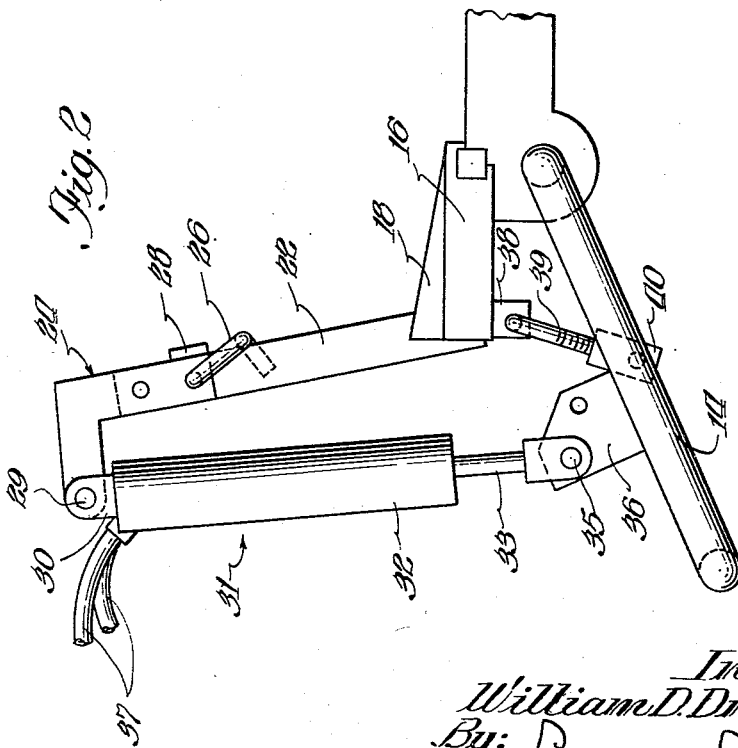
Inventor:
William D. Drummond
By: Paul O. Pippel
Attorney.

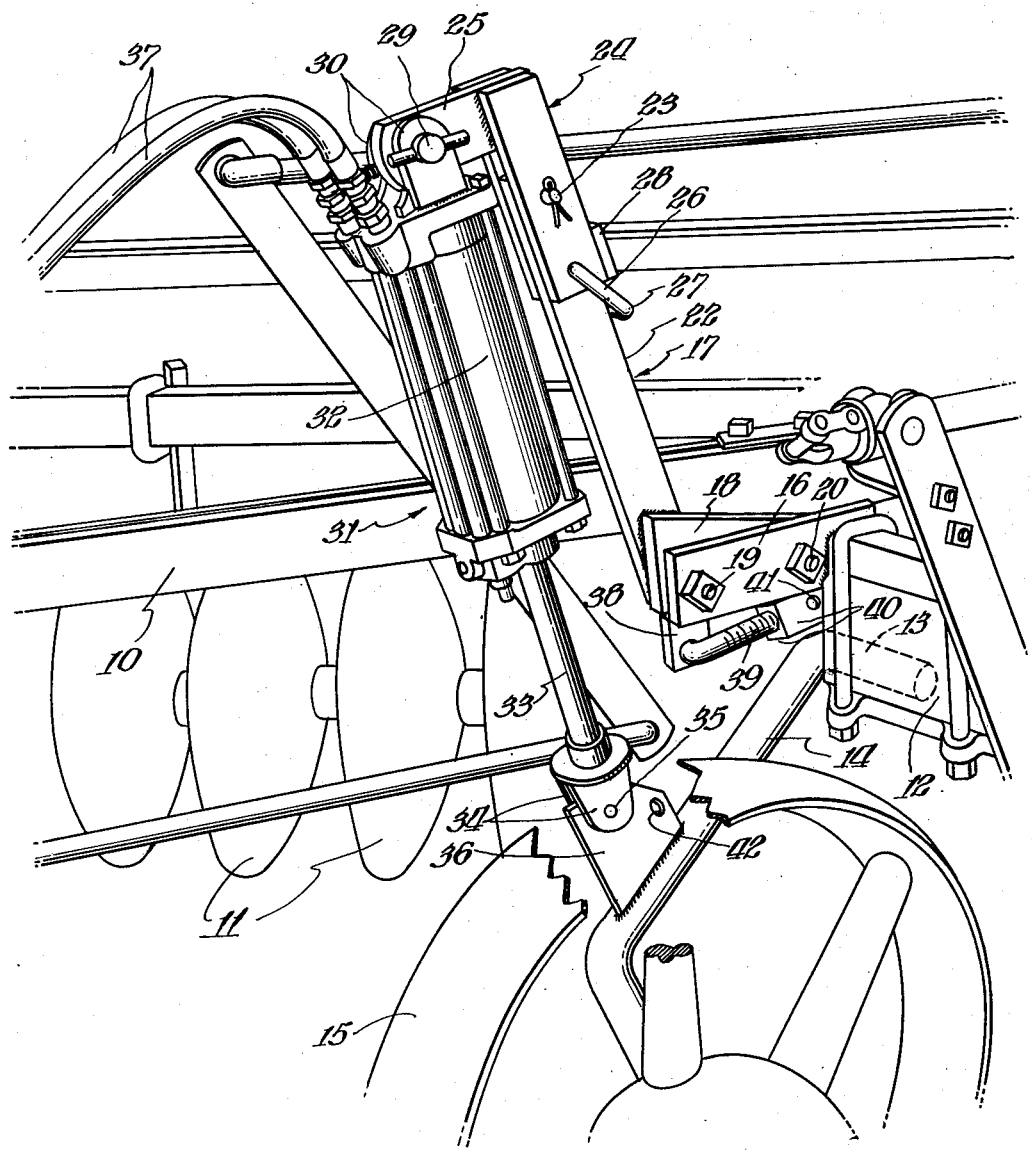

Patented Feb. 2, 1954

2,668,062

UNITED STATES PATENT OFFICE 2,668,062

VEHICLE TRAILER WITH DEMOUNTABLE HYDRAULIC LIFT

William D. Drummond, Burlington, Ontario, Canada, assignor to International Harvester Company, a corporation of New Jersey Application August 31, 1951, Serial No. 244,675

10 Claims. (Cl. 280—44)

This invention relates to agricultural implements and particularly to lifting mechanism therefor. More specifically the invention concerns power lift mechanism for an implement of the trail-behind type.

In trail-behind implements and particularly implements of the type utilizing a tool supporting frame and a wheel carrying crank axle mounted on the frame and swingable in a vertical plane to raise and lower the tools, it is well known to provide a hydraulic ram unit mounted on the frame and connected to the wheel for raising and lowering the implement. It is also well known to provide means for locking the wheel with respect to the frame when the implement is in transport position so that the ram unit can be removed and used for other purposes. Upon replacing the ram unit upon the implement or providing a new ram unit therefor, the ram unit sometimes does not fit the spacing between the anchoring bracket and the wheel carrying crank axle. By trial and error then, the piston must be moved in the cylinder until the ram unit reaches the desired length for fitting upon the implement.

Therefore, an object of this invention is to provide an improved mounting for a ram unit upon an implement.

Another object of the invention is to provide an improved mounting for a ram unit upon a trail-behind implement wherein means are provided for facilitating the attachment of ram units of varying lengths to the implement in position for operating the movable parts thereof.

A further object of the invention is the provision of an improved mounting mechanism for a ram unit upon an implement wherein the mounting mechanism is provided with pivoted parts which may be allowed to pivot to facilitate connection of the ram unit and may optionally be made rigid with the mounting.

Other objects and advantages of the invention will become clear from the following detailed description when read in conjunction with the accompanying drawings, wherein:

Figure 1 is a view in perspective of a portion of an implement of the disk plow type having power lift mechanism thereon embodying the features of this invention;

Figure 2 is a diagrammatic view of the hydraulic cylinder mounting on the implement frame with the parts in position for operation of the implement; and Figure 3 is a diagrammatic view similar to Figure 2 but showing the implement shaft locked in transport position and with the hydraulic ram unit partly detached.

Referring to the drawings, it may be noted that the implement with which the present power lift mechanism is associated is of conventional construction and includes generally a longitudinally and diagonally extending beam 10 carrying a plurality of earth working disks 11. Forming a part of and affixed to the frame of the plow is a bearing block 12 adapted to receive for rotation on a generally transverse axis the laterally bent portion 13 of a crank axle 14 which extends forwardly and downwardly in the direction of travel of the implement and has mounted upon its laterally bent lower end a ground engaging land wheel 15. When the implement is in the position indicated in Figure 1 for example, the earth working disks 11 are raised above the level of the ground for transport. In order to lower the tools to their operating position, the crank axle 14 is caused to move in a vertical plane upwardly in order to swing the wheel 15 with respect to the frame 10.

Affixed to the frame of the plow above the crank axle 14 is a forwardly extending bar 16 to which is secured a generally vertically extending L-shaped bracket 17. Bracket 17 has a lower base portion 18 which abuts against the bar or plate 16 and is secured thereto by a pair of bolts 19 and 20.

The upwardly extending portion 22 of bracket 17 carries at its upper end the pivot pin 23 of a link 24 comprising spaced members straddling the upper portion of bracket member 22 and having an arm 25 secured between the upper ends thereof and extending at right angles thereto. The upper end of the member 22 is likewise apertured and adapted to register with an aperture provided in the link 24 to receive the laterally bent end of a hook 26, the other end of which is bent laterally to form a hook portion 27 adapted to engage the rear edge of the member 22. A stop 28 on the link 24 is arranged to engage the rear edge of member 22 when the aperture in link 24 and member 22 exactly line up to facilitate the insertion or removal of the hook 26.

The end of arm 25 is provided with an opening to receive a pivot pin 29 upon which are pivoted the laterally spaced ears 30 formed on the cylinder end of a ram unit 31. Ram unit 31 comprises the cylinder 32 which is anchored to the pin 29 and a piston rod 33 slidable in the cylinder and having ears 34 at its end pivoted upon a pin 35 mounted upon a lug 36 affixed to the forwardly and downwardly extending portion of the crank axle 14. The implement of this invention is preferably drawn by a tractive vehicle such as a tractor having a power plant thereon and having means for supplying fluid under pressure to the ram unit through flexible hose lines 37.

In the position of the parts shown in Figure 1 the piston 33 has been extended in the cylinder 32 to rock the crank axle 14 about its axis to raise the implement to an inoperative position.

In order to lock the implement in its transport position and remove the ram unit 31 for other uses or for storing the implement, there is provided a lug 38 depending from the bracket 17 and orificed at its lower end to pivotally receive the bent end of a link 39, the other end of which has affixed thereto a block 40 also provided with an opening 41. The operator actuates the ram unit 31 until the link 39 can be placed in a position with opening 41 in registry with an opening 42 provided in the lug 36. Registration is facilitated by the provision of a threaded bore in the block 40 to receive the threaded shank of link 39. The hook 26 is then withdrawn from locking position with respect to the link 24 and bracket member 22 and is inserted in the openings 41 and 42 so that the link 39 then functions as a locking link to lock the wheel 15 with respect to the plow frame and to hold the implement in its transport position. At this time link 24 is free to swing about its pivot 23 to permit easy removal of the pins 29 and 35 and permit the ready disengagement of the ram unit from the mounting mechanism on the frame.

The hook member 26 may thus be optionally used in either position to hold the link 24 rigid with respect to the bracket 17 or to lock link 39 to the frame and to the crank axle supporting the ground engaging wheel. By the optional use of the locking member 26 it should be clear that the ram unit 31 cannot be engaged hydraulically between the bracket 17 and the crank axle 14 and at the same time locked mechanically against extension or retraction of the piston rod in the cylinder as would be the case if the link 24 were locked to the bracket 22 at the same time that the link were locked to the lug 36. Furthermore, the reattachment of a cylinder and piston unit to the implement is made relatively simple by the pivoted link 24, the range of pivoting thereof facilitating the attachment of the cylinder to the piston 29 in arm 25 irrespective of the length of the ram unit.

The operation of the power lift mechanism of this invention should be clear from the foregoing description. It should be understood, however, that modifications may be made in the invention without departing from the spirit thereof or the scope of the appended claims.

What is claimed is:

1. For use with a vehicular structure having a frame, a wheel-carrying axle mounted on the frame for movement relative thereto, and a ram unit for moving the axle: mounting mechanism for the ram unit comprising means serving as a generally vertically extending supporting bracket carried on the frame, a pair of spaced links pivotally mounted on the upper and lower portions of said bracket, a releasable connecting member connecting the lower of said links to the axle to lock the latter against movement relative to the frame, and a member connecting one end of the ram unit to the axle and the other end to the upper of said pivoted links, said releasable connecting member being optionally operable, upon release of the lower link from the axle, to lock the upper of said links against pivoting.

2. For use with a vehicular structure having a frame, a wheel-carrying axle mounted on the frame for movement relative thereto, and a ram unit for moving the axle: mounting mechanism for the ram unit comprising a pair of spaced links pivotally mounted on the upper and lower portions of the frame, a releasable connecting member connecting the lower of said links to the axle to lock the latter against movement relative to the frame, and a member connecting one end of the ram unit to the axle and the other end to the upper of said pivoted links, said releasable connecting member being operable, upon release of the lower link from the axle, to lock the upper of said links against pivoting on the frame.

3. For use with a vehicular structure having a frame, a wheel-carrying axle mounted on the frame for movement relative thereto, and a ram unit for moving the axle: mounting mechanism for the ram unit comprising a pair of spaced links pivotally mounted on the upper and lower portions of the frame, and locking means connecting the lower of said links to the axle to prevent movement thereof relative to the frame, said locking means being optionally connectable between the upper of said pivoted links and the frame to secure said link to the frame upon release of the lower link, whereby the ram unit forms a rigid connection between the frame and the axle, the ram unit being extensible and retractable to move the axle.

4. For use with a vehicular structure having a frame and a wheel-carrying axle mounted on the frame for movement relative thereto: a power lift unit mounted on the frame comprising a generally vertically extending bracket affixed to the frame, a pair of spaced links pivotally mounted adjacent one end on the upper and lower portions of said bracket, a stop on one of said links arranged to abut the bracket and limit pivoting of the link in one direction, releasable locking means connecting the latter link rigidly to the bracket, and a removable ram unit generally parallel to the bracket connected at one end to the last mentioned link and at the other end to said axle for vertically moving the latter, said locking means, upon removal of the ram unit being optionally connectable between the other of said links and the axle to prevent movement thereof relative to the frame.

5. For use with a vehicular structure having a frame and a wheel-carrying axle mounted on the frame for movement relative thereto: a power lift unit mounted on the frame comprising a generally vertically extending bracket affixed to the frame, a pair of spaced links pivotally mounted adjacent one end on the upper and lower portions of said bracket on vertically spaced parallel axes, releasable locking means connecting the upper of said links to the bracket, and an extensible member connecting said upper link to said axle for moving the latter, the lower of said links being connectable to said axle, upon removal of the ram unit, to prevent movement of the axle.

6. For use with a vehicular structure having a frame and a wheel-carrying axle mounted on the frame for movement relative thereto: a power lift unit mounted on the frame comprising a generally vertically extending bracket affixed to the frame, a pair of spaced links pivotally mounted adjacent one end on the upper and lower portions of said bracket on vertically spaced parallel axes, releasable locking means connecting the upper of said links to the bracket, and an extensible member connecting said upper link to said axle for moving the latter, said locking means being optionally operable to connect the lower of said links to the axle to hold the latter against movement relative to the frame.

7. For use with a vehicular structure having a frame and a wheel-carrying axle mounted on the frame for movement relative thereto: a power lift unit mounted on the frame comprising a pair of swinging links pivotally mounted adjacent one end on the frame on vertically spaced parallel axes, a ram unit pivotally connected to the free end of the upper of said links and to the axle, and a removable locking pin connecting the lower of said links to the axle to hold the latter against movement, said locking pin being optionally operable, upon release of the lower link from its connection to the axle, to lock said upper link to the frame, whereby the ram unit is operable to move said axle.

8. For use with a vehicular structure having a frame, a ram operable between extended and collapsed positions and a part movable relative to the frame: means for mounting the ram unit on the frame for operating the movable part, comprising a first arm pivoted on the frame, detachable means connecting one end of the ram to said arm, whereby the ram is movable relative to the frame about the axis of the arm thereon, detachable means connecting the other end of the ram to the movable part, a second arm pivoted on the frame at a location spaced from the connection of said first arm thereto, releasable locking means connecting said second arm to the movable part, and releasable locking means connecting said first arm to the frame to prevent pivoting thereof.

9. For use with a vehicular structure having a frame, a ram operable between extended and collapsed positions and a part movable relative to the frame: means for mounting the ram unit on the frame for operating the movable part, comprising a first arm pivoted on the frame, detachable means connecting one end of the ram to said arm, whereby the ram is movable relative to the frame about the axis of the arm thereon, detachable means connecting the other end of the ram to the movable part, a second arm pivoted on the movable part, releasable locking means connecting said first arm to the frame to provide a rigid anchor for one end of the ram, and releasable locking means connecting said second arm to the frame upon release of the locking means for said first arm.

10. For use with a vehicular structure having a frame, a ram operable between extended and collapsed positions and a part movable relative to the frame: means for mounting the ram unit on the implement for operating the movable part, comprising a first arm pivoted on the frame, detachable means connecting one end of the ram to said arm, whereby the ram is movable relative to the frame about the axis of the arm thereon, detachable means connecting the other end of the ram to the movable part, releasable locking means connecting said first arm to the frame to provide a rigid anchor for one end of the ram, and a second arm operable upon release of the locking means for said first arm for releasably locking the movable member to the frame.

WILLIAM D. DRUMMOND.

References Cited in the file of this patent

UNITED STATES PATENTS

| Number | Name | Date |
|---|---|---|
| 2,164,845 | Steed et al. | July 4, 1939 |
| 2,222,116 | Mott | Nov. 19, 1940 |
| 2,323,412 | Noble | July 6, 1943 |
| 2,392,006 | Silver | Jan. 1, 1946 |
| 2,495,449 | Francis | Jan. 24, 1950 |
| 2,501,750 | Warner | Mar. 28, 1950 |
| 2,532,577 | Silver et al. | Dec. 5, 1950 |
| 2,540,100 | Coeur | Feb. 6, 1951 |
| 2,545,111 | Schaubert | Mar. 13, 1951 |
| 2,577,885 | Gay | Dec. 11, 1951 |
| 2,580,100 | Johansen | Dec. 25, 1951 |
| 2,588,918 | Graham | Mar. 11, 1952 |